United States Patent
Sun et al.

(10) Patent No.: US 6,295,130 B1
(45) Date of Patent: Sep. 25, 2001

(54) STRUCTURE AND METHOD FOR A MICROELECTROMECHANICALLY TUNABLE FABRY-PEROT CAVITY SPECTROPHOTOMETER

(75) Inventors: Decai Sun, Sunnyvale, CA (US); Joel A. Kubby, Rochester; Alex T. Tran, Ithaca, both of NY (US); Eric Peeters, Fremont, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/469,892

(22) Filed: Dec. 22, 1999

(51) Int. Cl.$^7$ .................................................. G01B 9/02
(52) U.S. Cl. .................................. 356/454; 356/519
(58) Field of Search ..................... 356/454, 519

(56) References Cited

U.S. PATENT DOCUMENTS

| | | | |
|---|---|---|---|
| 4,825,262 | * | 4/1989 | Mallinson .......................... 356/454 |
| 4,859,060 | * | 8/1989 | Katagiri et al. .................... 356/454 |
| 5,561,523 | * | 10/1996 | Blomberg et al. ................. 356/454 |
| 5,909,280 | * | 6/1999 | Zavracky ............................ 356/454 |
| 6,078,395 | * | 6/2000 | Jourdain et al. ................... 356/519 |

FOREIGN PATENT DOCUMENTS

WO 99/34484   7/1999  (WO) .

OTHER PUBLICATIONS

Peeters, Eric. "Process Development For 3D Silicon Microstructures, With Application To Mechanical Sensor Devices," *Dissertation Doctorate from Katholieke Universiteit Leuven*, 1994, pp. 170–193, 208–219.

Tran, A.T.T.D. et al. "Surface Micromachined Fabry–Perot Tunable Filter." *IEEE Photonics Technology Letters*, vol. 8, No. 3, Mar. 1996, pp. 393–395.

Vail, E.C. et al. "GaAs Micromachined Widely Tunable Fabry–Perot Filters." *Electronics Letters*, vol. 31, No. #, Feb. 2, 1995, pp. 228–229.

* cited by examiner

*Primary Examiner*—Samuel A. Turner

(57) ABSTRACT

A microelectromechanically tunable Fabry-Perot spectrophotometer is provided for color sensing. Optical fiber provides light input to a Fabry-Perot filter which is adjusted by a switched capacitor circuit. Spectral intensity is sensed by an integrated photodetector.

19 Claims, 9 Drawing Sheets

STRUCTURE AND METHOD FOR A MICROELECTROMECHANICALLY TUNABLE FABRY-PEROT CAVITY SPECTROPHOTOMETER

This invention was made with United States Government support awarded by the Department of Commerce under Contract No. 70NANB8H4014. The United States Government has certain rights in this invention.

BACKGROUND OF INVENTION

In xerographic color printing applications, it is desirable to have in situ monitoring systems to measure the color accuracy of the printing. Hence, it is useful to have compact and economical spectrophotometers in color printers to provide for color sensing capability and other color sensing applications.

SUMMARY OF INVENTION

A compact microelectromechanically tunable spectrophotometer having a Fabry-Perot cavity filter is integrated with a silicon photodetector and an optical fiber is used for inputting light vertically on a silicon substrate to make a color sensing system. The Fabry-Perot cavity thickness in accordance with the invention may be tuned electrostatically to resolve the spectral distribution of the transmitted light signal. The spectrophotometer system has applications to color sensing in xerography and other spectroscopic applications. The use of a charge drive mode for tuning the Fabry-Perot cavity filter avoids the electrostatic instability of a voltage drive mode and provides better linearity than use of a voltage drive mode.

BRIEF DESCRIPTION OF THE DRAWINGS

The drawings presented herein are for illustrative purposes only and are not drawn to scale.

DETAILED DESCRIPTION

Figure 1:
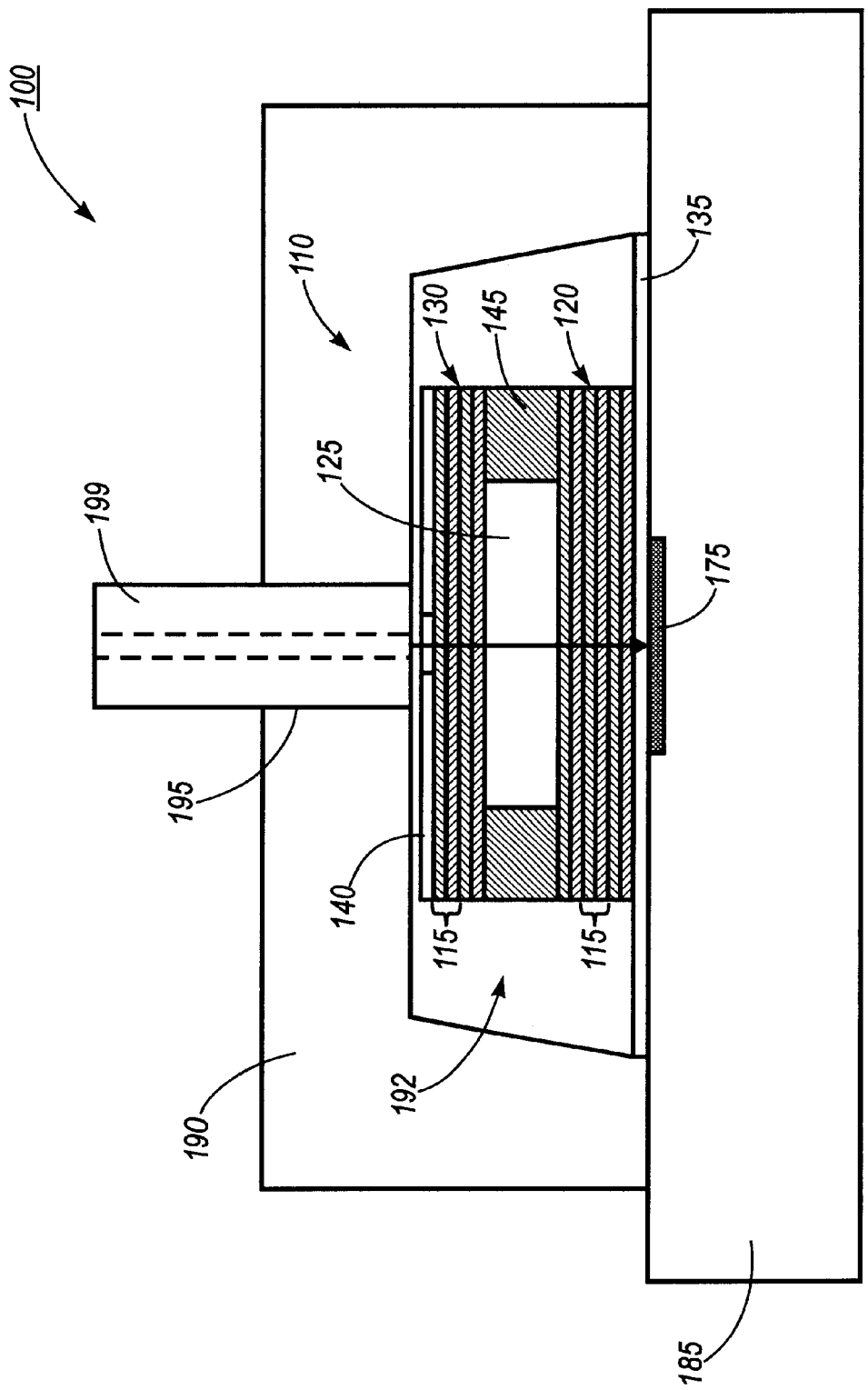
FIG. 1 shows an embodiment of a microelectromechanically tunable spectrophotometer in accordance with the present invention.

FIG. 1 shows an embodiment of microelectromechanically tunable spectrophotometer 100 in accordance with the present invention. Fabry-Perot cavity filter 110 is composed of three pairs of quarter wavelength $Si/SiN_x$ stacks 115 for bottom distributed Bragg reflector (DBR) mirror 120, air gap cavity 125 and two pairs of quarter wavelength $Si/SiN_x$ stacks 115 for top distributed Bragg reflector (DBR) mirror 130. Indium tin oxide (ITO) is used for transparent bottom electrode 135 and transparent top electrode 140.

Top mirror 130 may be deformed to change the height of air gap cavity 125 by applying a voltage in the range of 100 volts across transparent bottom electrode 135 and transparent top electrode 140 or a charge in the range of $10^{-11}$ coulombs on transparent bottom electrode 135 and transparent top electrode 140 to effect a change in the height of air gap cavity 125 of about 300 to 500 nm. Hence, electrodes 135 and 140 form a capacitor and Fabry-Perot cavity filter 110 has an associated capacitance. As the height of air gap cavity 125 decreases, the Fabry-Perot transmission peak shifts to shorter wavelengths as shown in FIGS. 7a and 7b where air gap cavity 125 height decreases to the left.

For example, for air gap cavity 125 having a height of 750 nm, quarter wavelength $Si/SiN_x$ stacks 115 have a central wavelength of 700 nm. As the height of air gap cavity 125 is decreased, shorter wavelength spectral peaks are resolved by photodetector 175. Typical response time for photodetector 175 is about $10^{-10}$ seconds compared to the mechanical response times typically on the order of $10^{-6}$ seconds.

Figure 7A:
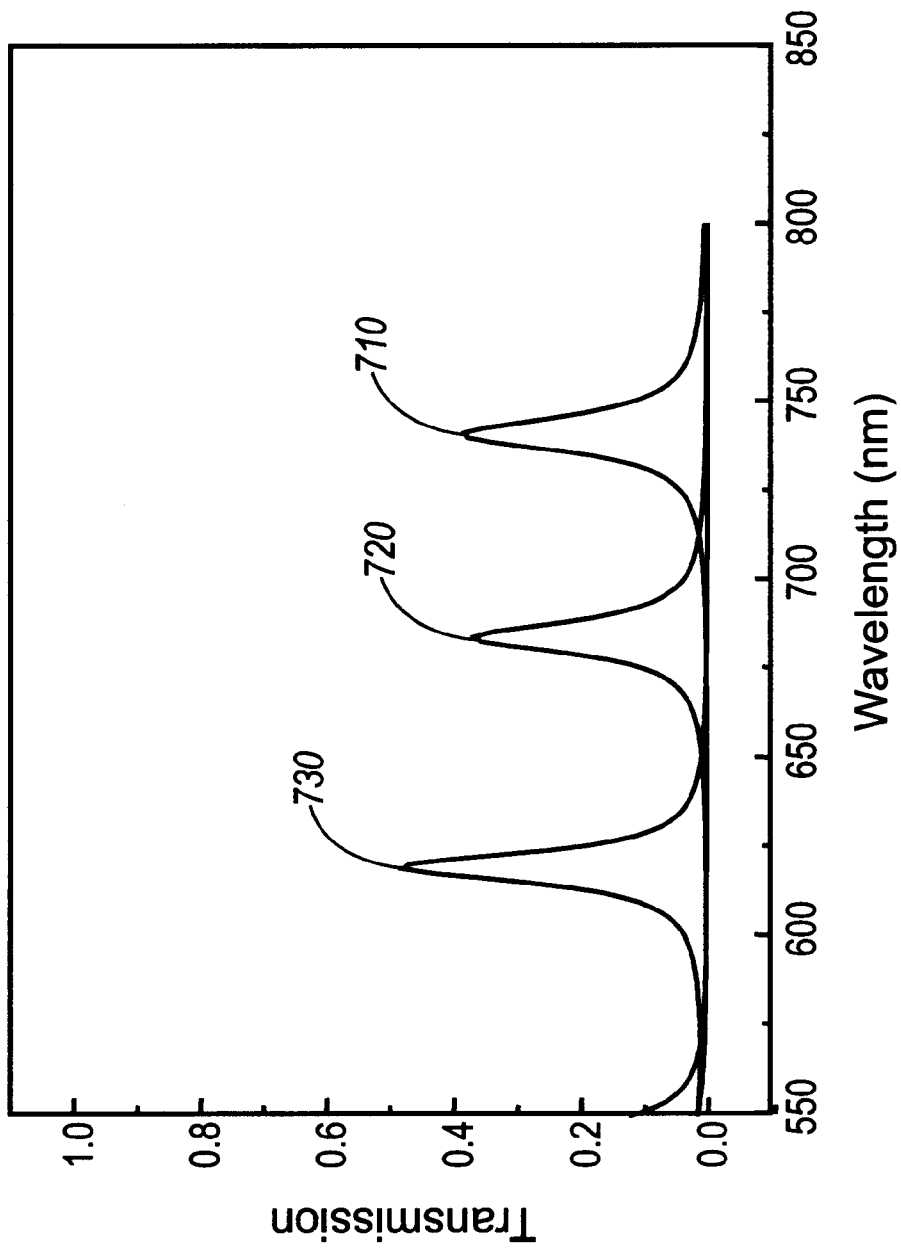
FIG. 7a shows the dependence of light transmission on wavelength with decreasing air gap cavity height in accordance with an embodiment of the invention.
Figure 7B:
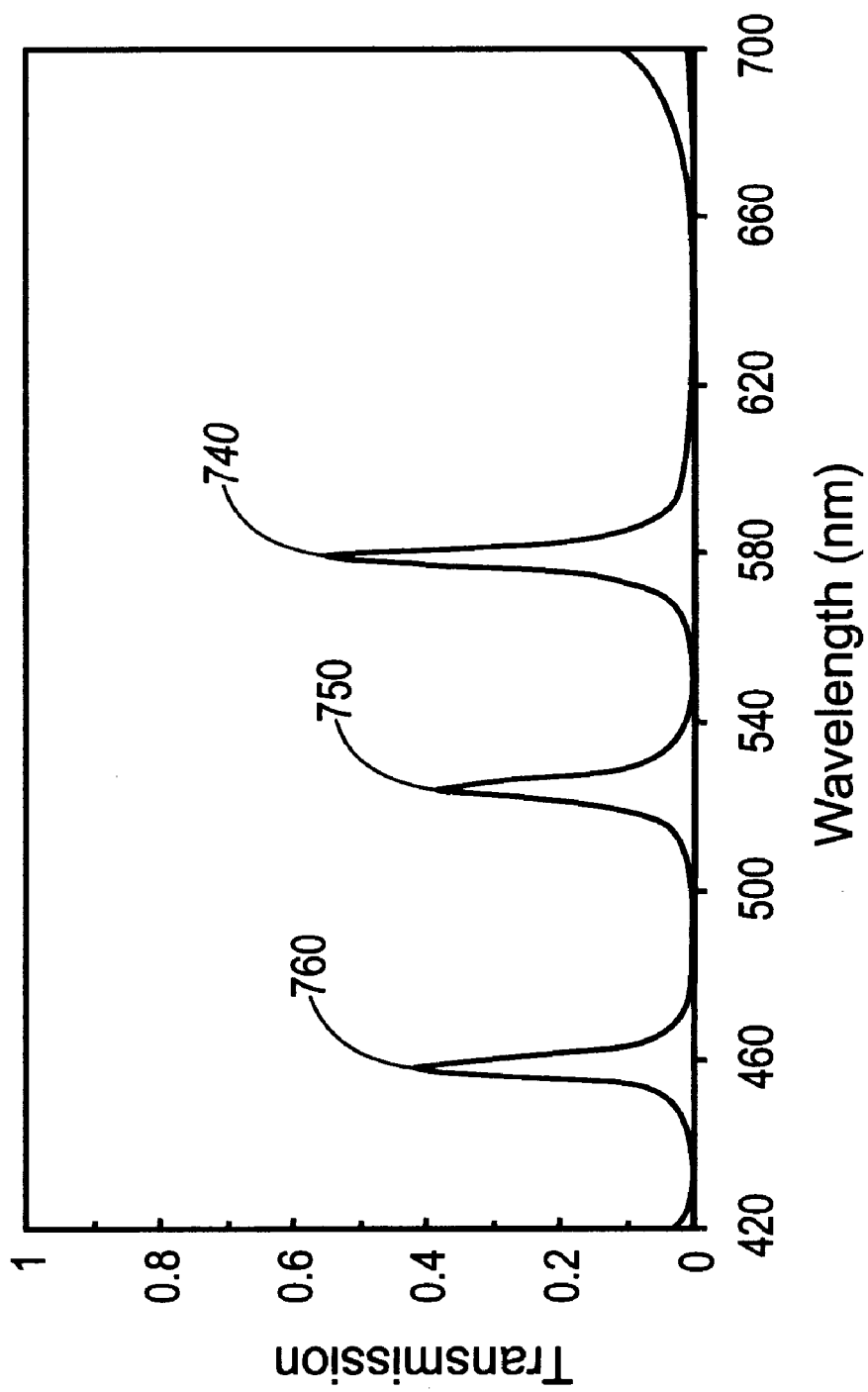
FIG. 7b shows the dependence of light transmission on wavelength with decreasing air gap cavity height in accordance with an embodiment of the invention.

The transmission wavelength tuning of Fabry-Perot cavity filter 110 is simulated in FIGS. 7a and 7b. Fabry-Perot cavity filter 110 used in FIG. 7a uses quarter wavelength $Si/SiN_x$ stacks 115 centered at 700 nm. The tunable range for quarter wavelength $Si/SiN_x$ stacks 115 centered at 700 nm stops at 600 nm. Fabry-Perot cavity filter 110 used in FIG. 7b uses quarter wavelength $Si/SiN_x$ stacks 115 centered at 500 nm. The tunable range for quarter wavelength $Si/SiN_x$ stacks 115 centered at 500 nm is limited to 450 nm for the lower end of the range. Hence, using two Fabry-Perot cavity filters 110 with first Fabry-Perot cavity filter 110 being centered at 700 nm and second being Fabry-Perot cavity filter 110 centered at 500 nm allows coverage of the entire visible spectrum.

By calculating the transmission of Fabry-Perot cavity filter 110 having quarter wavelength $Si/SiN_x$ stacks 115 centered at 700 nm (see FIG. 7a) and Fabry-Perot cavity filter 110 having quarter wavelength $Si/SiN_x$ stacks 115 centered at 500 nm (see FIG. 7b) as a function of wavelength for air gap cavity 125 with peak 710 at 750 nm, peak 720 at 680 nm, peak 730 at 600 nm and peak 740 at 600 nm, peak 750 at 530 nm, peak 760 at 450 nm, respectively, the transmission spectrum for both Fabry-Perot cavity filters 110 can be determined as a function of bias voltage. To avoid intensity contributions below 600 nm when using Fabry-Perot cavity filter 110 having quarter wavelength $Si/SiN_x$ stacks 115 centered at 700 nm, a color filter is used to prevent wavelengths below 600 nm from reaching photodetector 175. The color filter is needed because wavelengths shorter than 600 nm are transmitted through Fabry-Perot cavity filter 110 having quarter wavelength $Si/SiN_x$ stacks 115 centered at 700 nm.

If microelectromechanically tunable spectrophotometer 100 is calibrated with a calibration light source, the bias voltage needed to tune Fabry-Perot filter 110 to a certain wavelength is known. Therefore, two microelectromechanically tunable spectrophotometers 100 enable the output of spectral intensity as a function of wavelength for the entire visible spectrum.

Spectral resolution of spectrophotometer 100 depends on the mean reflectivity of top mirror 130 and bottom mirror 120; higher mean reflectivity provides higher spectral resolution. For spectrophotometer 100, a spectral resolution of 10 nm is typical for color printing applications. The spectral range that Fabry-Perot cavity filter 110 can resolve depends on the initial height of air gap cavity 125 and quarter wavelength $Si/SiN_x$ stacks 115 that are used. For light in the infrared regime, the height of air gap cavity 125 needs to be on the order of the infrared wavelength range. The mechanical tuning range of top mirror 130 may be structurally limited, further limiting the spectral range for Fabry-Perot cavity filter 110. If the mechanical tuning range of top mirror 130 is too small, additional spectrophotometers 100 with different initial heights for air gap cavity 125 may be needed to cover the spectral range needed. Two separate spectrophotometers 100 are typically needed for a system to cover the visible spectrum from about 450 to 750 nm.

By calculating the transmission of Fabry-Perot cavity filter 110 having quarter wavelength $Si/SiN_x$ stacks 115 centered at 700 nm (see FIG. 7a) and Fabry-Perot cavity filter 110 having quarter wavelength $Si/SiN_x$ stacks 115 centered at 500 nm (see FIG. 7b) as a function of wavelength for air gap cavity 125 with peak 710 at 750 nm, peak 720 at 680 nm, peak 730 at 600 nm and peak 740 at 600 nm, peak 750 at 530 nm, peak 760 at 450 nm, respectively, the transmission spectrum for both Fabry-Perot cavity filters 110 can be determined as a function of bias voltage. To avoid intensity contributions below 600 nm when using Fabry-Perot cavity filter 110 having quarter wavelength $Si/SiN_x$ stacks 115 centered at 700 nm, a color filter is used to prevent wavelengths below 600 nm from reaching photodetector 175. This is needed because wavelengths shorter than 600 nm are transmitted through Fabry-Perot cavity filter 110 having quarter wavelength $Si/SiN_x$ stacks 115 centered at 700 nm.

If microelectromechanically tunable spectrophotometer 100 is calibrated with a calibration light source, the bias voltage needed to tune Fabry-Perot filter 110 to a certain wavelength will be known. Therefore, two microelectromechanically tunable spectrophotometers 100 enable the output of spectral intensity as a function of wavelength for the entire visible spectrum.

Figure 2:
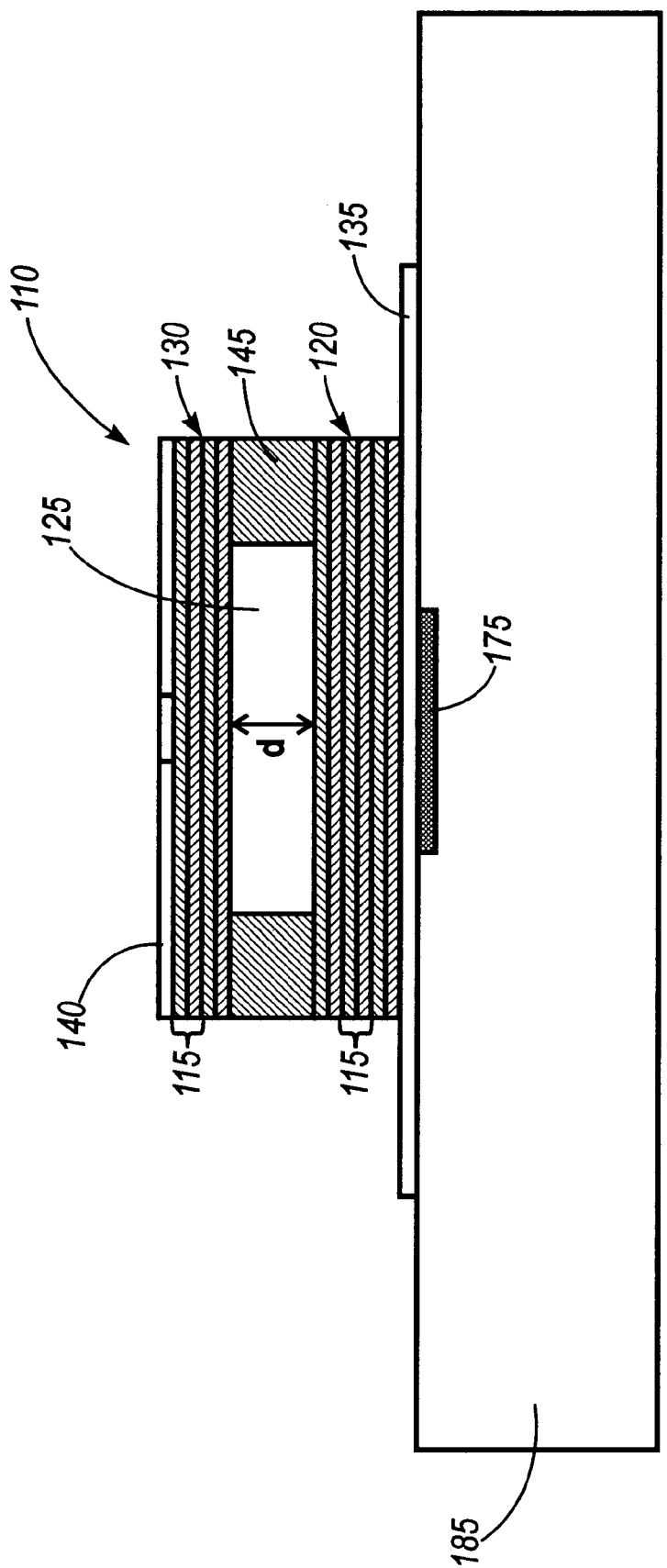
FIG. 2 shows a step in the fabrication of a microelectromechanically tunable spectrophotometer.

In an embodiment in accordance with the invention, spectrophotometer 100 is fabricated using semiconductor microelectromechanical system processing techniques with photodetector 175, typically silicon, and Fabry-Perot cavity filter 110 monolithically integrated on substrate 185 that is typically also silicon. With reference to FIG. 2, photodetector 175 is fabricated on substrate 185 using a standard CMOS process, see for example, S. M. Sze, "Semiconductor Sensors", 1994, which is incorporated by reference in its entirety.

Figure 3:
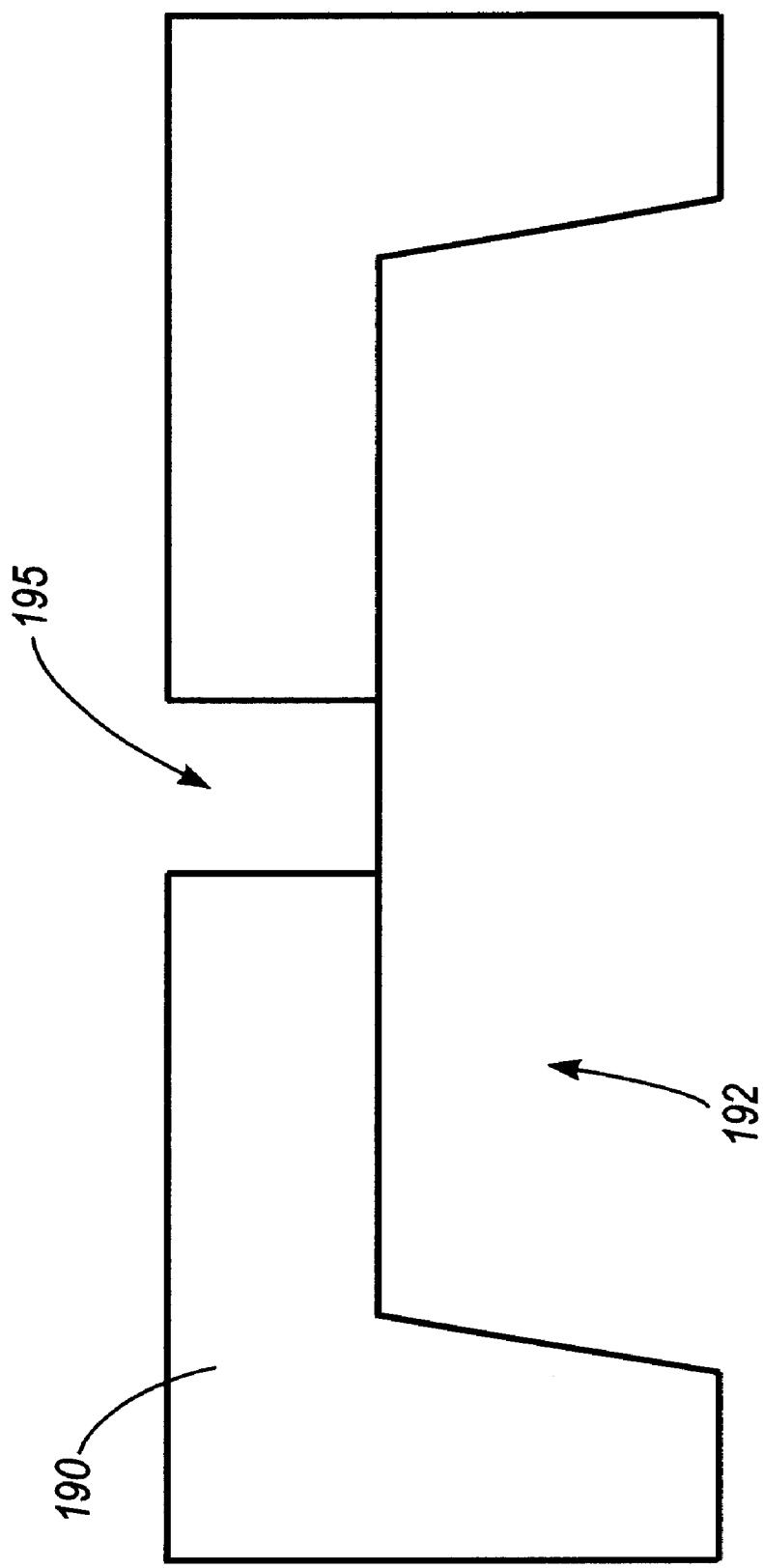
FIG. 3 shows an optical fiber mount in accordance with the present invention.
Figure 4:
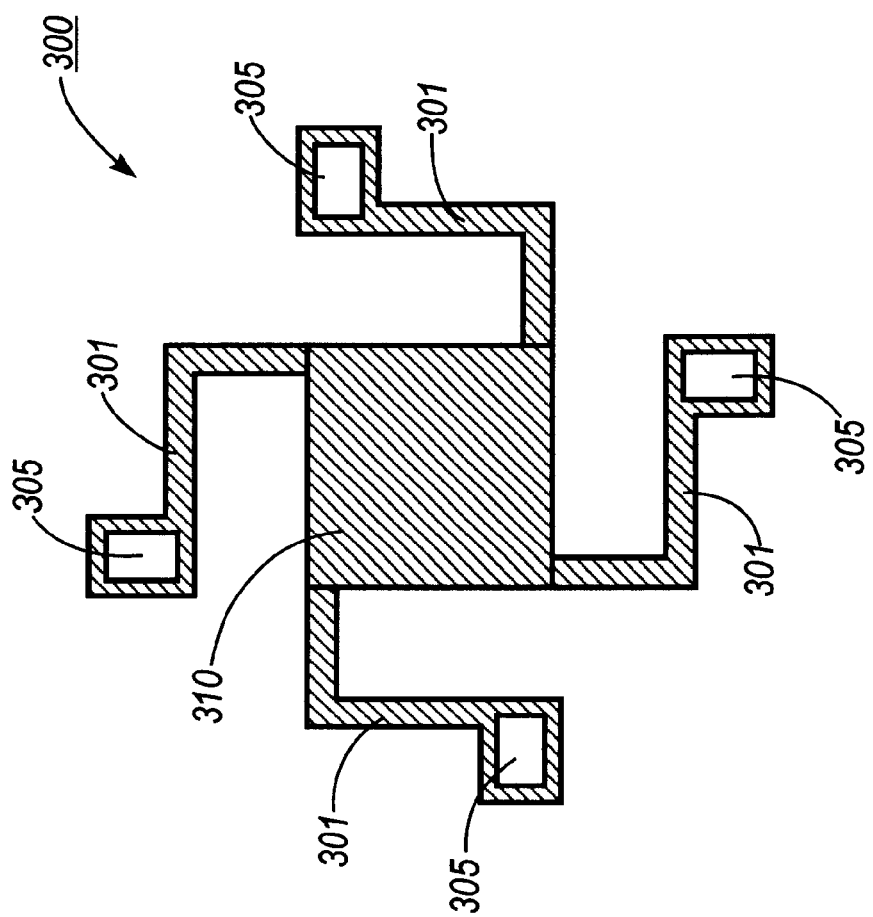
FIG. 4 shows a movable membrane in accordance with an embodiment of the present invention.

Transparent electrode 135, typically having a thickness of 100 nm, is deposited by sputtering over photodetector 175. Photodetector 175 is typically a p-i-n photodiode with the p-i-n junction being formed by either impurity diffusion or ion implantation. The n-layer of photodetector 175 is typically about 0.5 μm thick with an i-layer having a thickness in the range of 1–3 μm. Bottom DBR mirror 120 involves deposition of three pairs of quarter wavelength $Si/SiN_x$ stacks 115. The optical thickness of each stack 115 is typically about 175 nm. Aluminum layer 145 is deposited to a typical thickness of about 800 nm for subsequent formation of air gap cavity 125. Top DBR mirror 130 involves deposition of two pairs of quarter wavelength $Si/SiN_x$ stacks 115. Transparent electrode 140 is deposited over top DBR mirror 130 to serve as the top contact. With reference to FIG. 3, lithographic patterning is performed on transparent electrode 140 followed by a conventional dry etch of transparent electrode 140 and top DBR mirror 130 resulting in membrane 310 with four supporting arms 301 and anchors 305 as shown in FIG. 4. A subsequent wet etch is performed to undercut aluminum layer 145 underneath membrane 310 to form air gap cavity 125. Air gap cavity 125 may be fabricated by sacrificially etching away the interior of aluminum layer 145 typically using an etchant consisting of 80% phosphoric acid, 5% acetic acid, 5% nitric acid and 10% water.

Referring to FIG. 3, recess 192 is etched in silicon wafer 190 using either a dry or wet etch in accordance with an embodiment of the invention. Recess 192 typically has a depth of about 20 μm. Lithographic patterning is performed prior to etching circular hole 195. The diameter for circular hole 195 is chosen to match the diameter of multimode optical fiber 199. Etching of circular hole 195 is typically accomplished by deep reactive ion beam etching.

Silicon wafer 190 is aligned over silicon wafer 185 and Fabry-Perot filter 110 using a flip-chip pick and drop aligner. Bonding of silicon wafer 190 to silicon wafer 185 may be performed using either direct wafer bonding or epoxy. Optical fiber 199 is inserted into circular hole 195 and epoxied to silicon wafer 190 in making microelectromechanically tunable spectrophotometer 100 shown in FIG. 1. A convex lens (not shown) may be mounted at the end of optical fiber 199 to collimate the light before the light enters Fabry-Perot filter 110. The convex lens may be formed either by pulling the end of optical fiber 199 into a lens shape after melting or a microlens may be attached with an ultraviolet cured epoxy which has a refractive index matching optical fiber 199 and the microlens.

Figure 5:
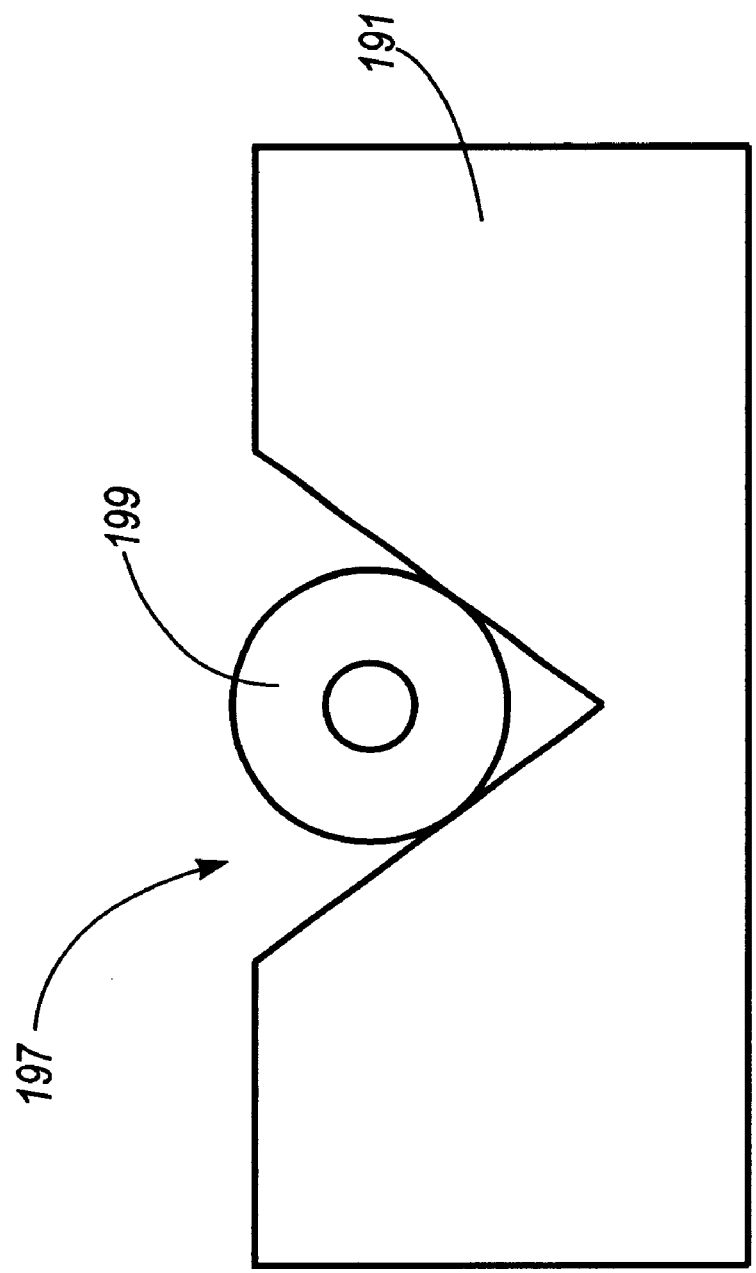
FIG. 5 shows an optical fiber mount in accordance with the present invention.
Figure 6:
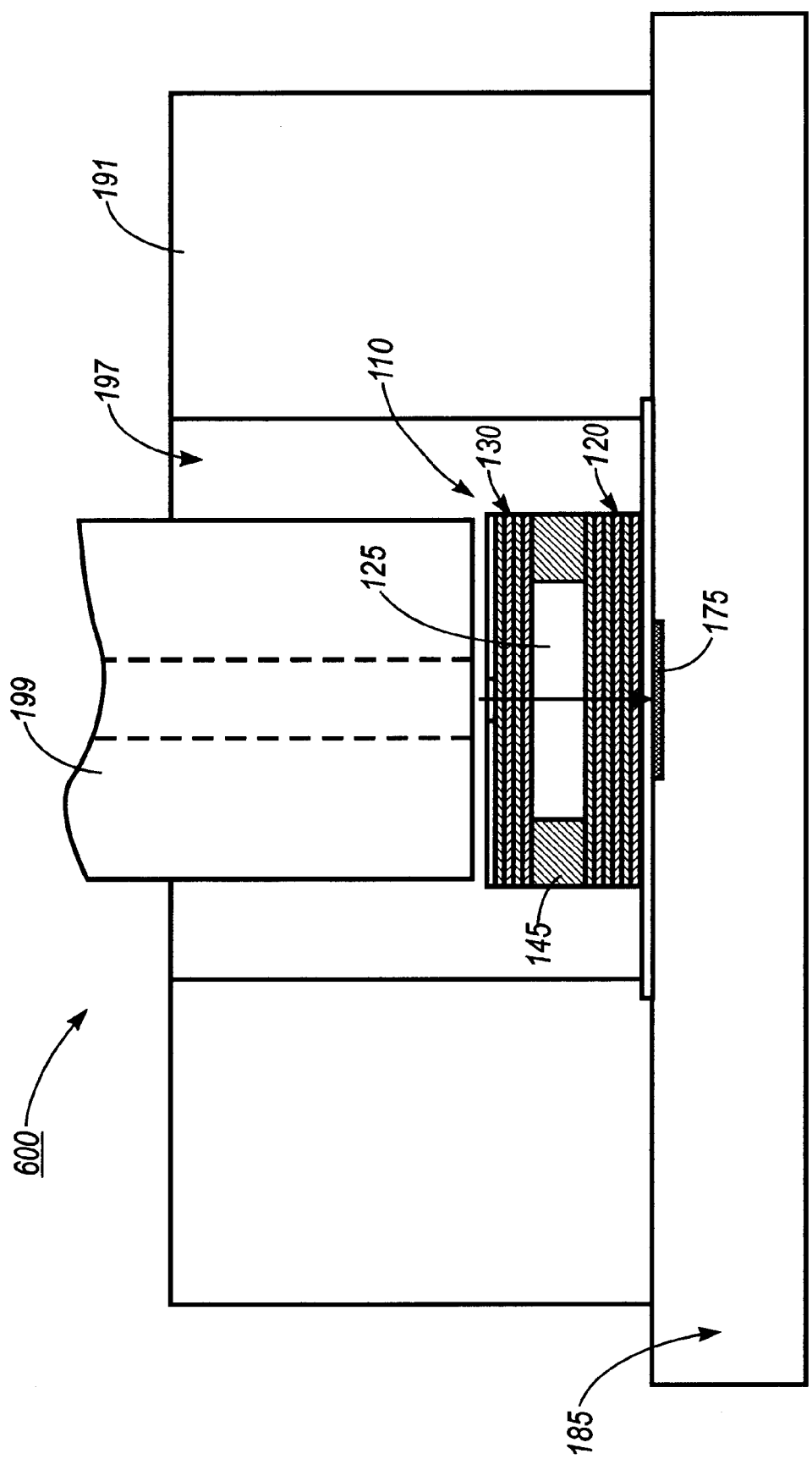
FIG. 6 shows an embodiment of a microelectromechanically tunable spectrophotometer in accordance with the present invention.

FIG. 5 shows an embodiment in accordance with the invention. Optical fiber 199 is mounted in v-groove 197 etched into silicon wafer 191. Silicon wafer 191 is subsequently aligned with silicon wafer 185 and Fabry-Perot filter 110 using precision alignment machine. Bonding of silicon wafer 191 to silicon wafer 185 may be performed using either direct wafer bonding or epoxy in making microelectromechanically tunable spectrophotometer 600 shown in FIG. 6.

Fabry-Perot filter 110 may be voltage driven where a voltage bias is applied to electrodes 140 and 135 to tune the resonant mode of Fabry-Perot filter 110 (see FIG. 2). Application of a bias voltage reduces the separation, d, between top DBR mirror 130 and bottom DBR mirror 120 by bending arms 301 (see FIG. 4) while leaving membrane 310 relatively undistorted. However, a voltage driven mode results in an electrostatic force between membrane 310 and bottom DBR mirror 120 that is inversely proportional to the separation squared, $d^2$ resulting in a significantly nonlinear response and electrostatic instability.

A solution to nonlinearity and electrostatic instability problems is offered by operating Fabry-Perot filter 110 in a charge driven mode. In contrast to the voltage driven mode where Fabry-Perot filter 110 is kept at a constant voltage, in the charge driven mode the charge on Fabry-Perot filter 110 is kept constant. When the charge on Fabry-Perot filter 110 is constant, the electrostatic force between membrane 310 and bottom DBR mirror 120 is independent of their separation, d resulting in better linearity and avoiding electrostatic instability.

Figure 8:
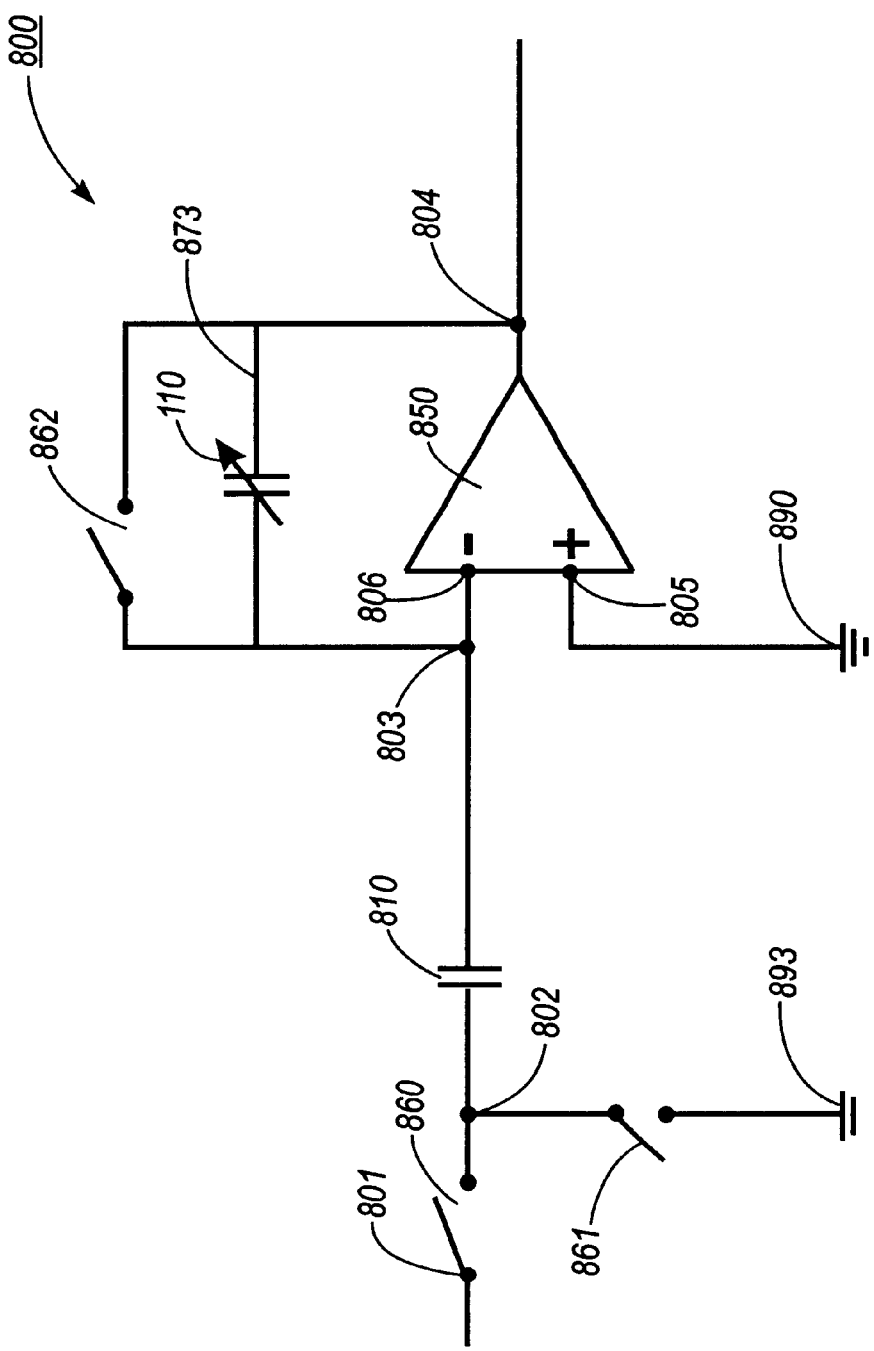
FIG. 8 shows a switched capacitor circuit in accordance with the present invention.

FIG. 8 shows switched capacitor circuit 800 in an embodiment in accordance with the invention to implement the charge driven mode for tuning microelectromechanically tunable spectrophotometer 100. Fabry-Perot filter 110 is connected as a capacitor in feedback loop 873 of operational amplifier 850 resulting in node 803 being kept at virtual ground. A voltage signal is input at node 801 which is connected to switch 860. Switch 860 connects to node 802. Capacitor 810 is connected between node 802 and node 803. Switch 861 connects capacitor 810 to ground 893 via node 802. Node 803 also connects to terminal 806 on operational amplifier 850, Fabry-Perot filter 110 in the feedback loop 873 of operational amplifier 850 and is connected to node 804 by switch 862. Node 804 is on the output side of operational amplifier 850 and connects to feedback loop 873 and switch 862. Terminal 805 of operational amplifier 850 is connected to ground 890.

Switches 860, 861 and 862 which may be transistors are controlled by a low power clock oscillator, such as a Connor-Winfield, HSM93-10.0000 10 MHz oscillator, which is used to generate two non-overlapping phases, $\phi_1$ and $\phi_2$. Signal $\phi_1$ is used to drive switches 860 and 862 while signal $\phi_2$ is used to drive switch 861. When signal $\phi_1$ is high and signal $\phi_2$ is low, switches 860 and 862 are closed and capacitor 810 is charged. When signal $\phi_2$ is high and signal $\phi_1$ is low, switch 861 is closed resulting in the transfer of the charge, q, stored on capacitor 810 to Fabry-Perot filter 110. Points 890 and 893 are at ground. Parasitic capacitance and leakage resistance to ground for the circuit shown in FIG. 8 have no effect on the output voltage at node 804 to first order. In addition, a shunt resistance and shunt capacitance are present in feedback loop 873. The shunt capacitance in feedback loop 873 adds to the capacitance of Fabry-Perot filter 110 and along with the shunt resistance add non-linearity to switched capacitor circuit 800. However, the total non-linearity is typically kept on the order of 1% full scale for the circuit shown in FIG. 8.

In accordance with an embodiment of the invention, a maximum input voltage of 2 volts is input at point 801 for Fabry-Perot filter 110 having a maximum capacitance of about 0.1 pF and capacitor 810 is selected to be 1.0 pF with a supply voltage of 20 volts to operational amplifier 850. To avoid charge leakage effects, a frequency of around 10 MHz is a typical frequency choice for the clock oscillator.

As is shown below, the input voltage, $V_{in}$, is proportional to the displacement, z, of upper membrane 310 from equilibrium. Taking $d_0$ to be the equilibrium separation, typically about 1 μm, $V_{out}$ to be the output voltage at point 804, $C_1$ to be the capacitance of capacitor 810, $C_x$ to be the capacitance of Fabry-Perot filter 110, A, the area of membrane 310 is on the order of 1 μm$^2$, k, the spring constant of membrane structure 300, is typically in the range from about 1–10 N/m, and $\epsilon_0$ the permittivity of the vacuum in MKS units gives:

$$V_{out}=C_1V_{in}/C_x \quad (1)$$

$$C_x=\epsilon_0 A/(d_0-z) \quad (2)$$

and from Equations (1) and (2)

$$V_{out}=C_1V_{in}(d_0-z) \quad (3)$$

or the height of air gap cavity 125 as a function of $V_{out}$ and $V_{in}$ is $$d=d_0-z=V_{out}/C_1V_{in} \quad (4)$$

The deflection of membrane structure 300 from equilibrium, z, may be expressed as a function of $V_{in}$ alone as:

$$z=kF_e=k(C_1V_{in})^2/(2\epsilon_0 A) \quad (5)$$

where $F_e$ is the electrostatic force acting on membrane structure 300 so that the eight of air gap cavity 125, d, is given by:

$$d=d_0-k(C_1V_{in})^2/(2\epsilon_0 A) \quad (6)$$

and Fabry-Perot filter 110 may be tuned to the desired wavelengths using FIG. 7, for example.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. A microelectromechanically tunable Fabry-Perot spectrophotometer structure comprising:
    a substrate having a first surface;
    a photodetector positioned on said first surface of said substrate;
    a first transparent electrode placed over said photodetector and said first surface of said substrate;
    a first mirror contacting said first transparent electrode;
    a second mirror separated from said first mirror by an air gap cavity; and
    a second transparent electrode contacting said second mirror wherein said second mirror is displaceable with respect to said first mirror by creation of an electric field between said first and said second electrodes.

2. The structure of claim 1 further comprising an optical fiber contacting said second transparent electrode.

3. The structure of claim 1 further comprising an optical fiber wherein light emitted from said optical fiber is collimated prior to passing through said second electrode.

4. The structure of claim 3 wherein said optical fiber is supported by a v-groove in a wafer.

5. The structure of claim 1 wherein said photodetector has a p-i-n structure.

6. A microelectromechanically tunable Fabry-Perot filter structure comprising:
    a substrate having a first surface;
    a first electrode placed on said first surface of said substrate;
    a first mirror contacting said first electrode;
    a second mirror separated from said first mirror by an air gap cavity; and
    a second electrode contacting said second mirror wherein said second mirror is displaceable a fixed distance with respect to said first mirror by introducing a fixed amount of electrical charge onto one of said electrodes.

7. The structure of claim 6 wherein said second electrode is transparent.

8. The structure of claim 6 wherein said second mirror is supported by a plurality of arms.

9. The structure of claim 6 wherein said first mirror comprises three pairs of quarter wavelength Si/SiN$_x$ stacks.

10. A Fabry-Perot spectrophotometer system comprising:
    a microelectromechanically tunable Fabry-Perot filter; and
    a switched capacitor circuit comprising an operational amplifier with said Fabry-Perot filter electrically coupled to the feedback loop of said operational amplifier.

11. A method for making a microelectromechanically tunable Fabry-Perot spectrophotometer structure comprising:
    providing a substrate having a first surface;
    providing a photodetector positioned on said first surface of said substrate;

providing a first transparent electrode placed over said photodetector and said first surface of said substrate;

providing a first mirror contacting said first transparent electrode;

providing a second mirror separated from said first mirror by an air gap cavity; and providing a second transparent electrode contacting said second mirror wherein said second mirror is displaceable with respect to said first mirror by creation of an electric field between said first and said second electrodes.

12. The method of claim 11 further comprising an optical fiber contacting said second transparent electrode.

13. The method of claim 11 further comprising an optical fiber wherein light emitted from said optical fiber is collimated prior to passing through said second electrode.

14. The method of claim 13 wherein said optical fiber is supported by a v-groove in a wafer.

15. The method of claim 11 wherein said photodetector has a p-i-n structure.

16. A method for making a microelectromechanically tunable Fabry-Perot filter structure comprising:

providing a substrate having a first surface;

providing a first electrode placed on said first surface of said substrate;

providing a first mirror contacting said first electrode;

providing a second mirror separated from said first mirror by an air gap cavity; and providing a second electrode contacting said second mirror wherein said second mirror is displaceable a fixed distance with respect to said first mirror by introducing a fixed amount of electrical charge onto one of said electrodes.

17. The method of claim 16 wherein said second electrode is transparent.

18. The method of claim 16 wherein said second mirror is supported by a plurality of arms.

19. The method of claim 16 wherein said first mirror comprises three pairs of quarter wavelength $Si/SiN_x$ stacks.

* * * * *